Figure 1:
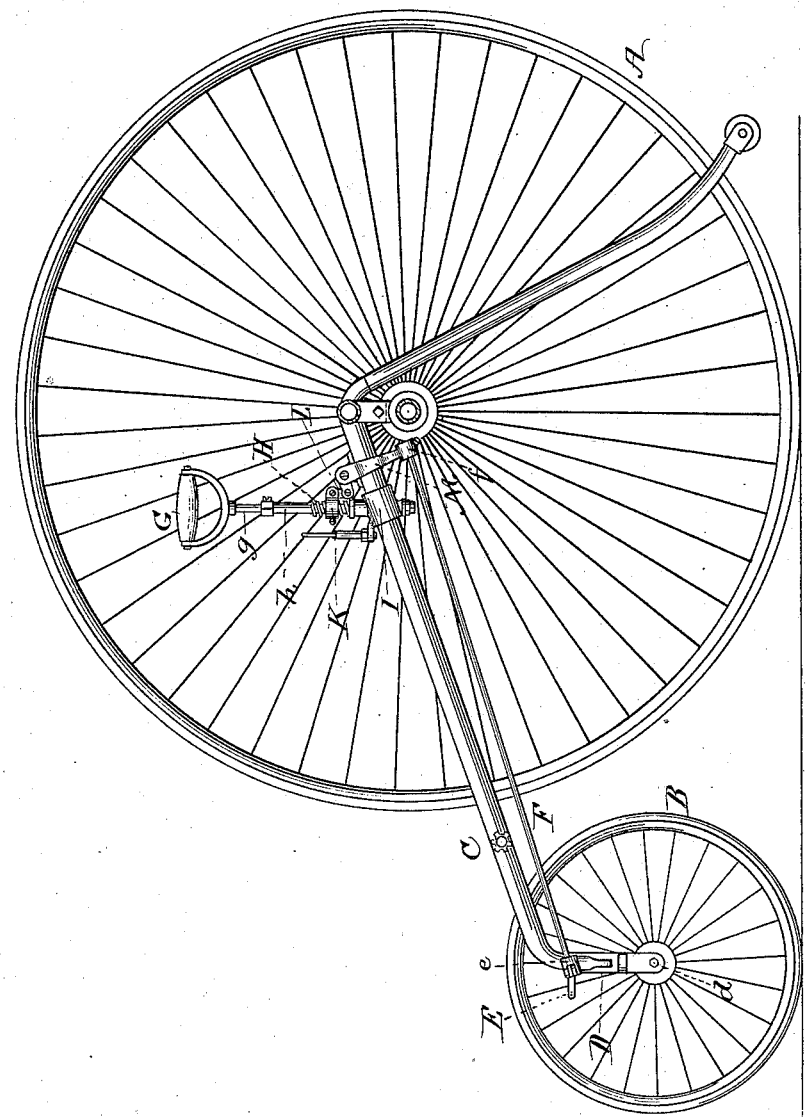

(No Model.)

2 Sheets—Sheet 1.

H. M. POPE.
VELOCIPEDE.

No. 365,702.

Patented June 28, 1887.

WITNESSES.
Ann C. Mackie.
Stedman Buttrick.

INVENTOR.
Harry M. Pope
By Charles E. Pratt
Atty (No Model.) 2 Sheets—Sheet 2.
H. M. POPE.
VELOCIPEDE.
No. 365,702. Patented June 28, 1887.
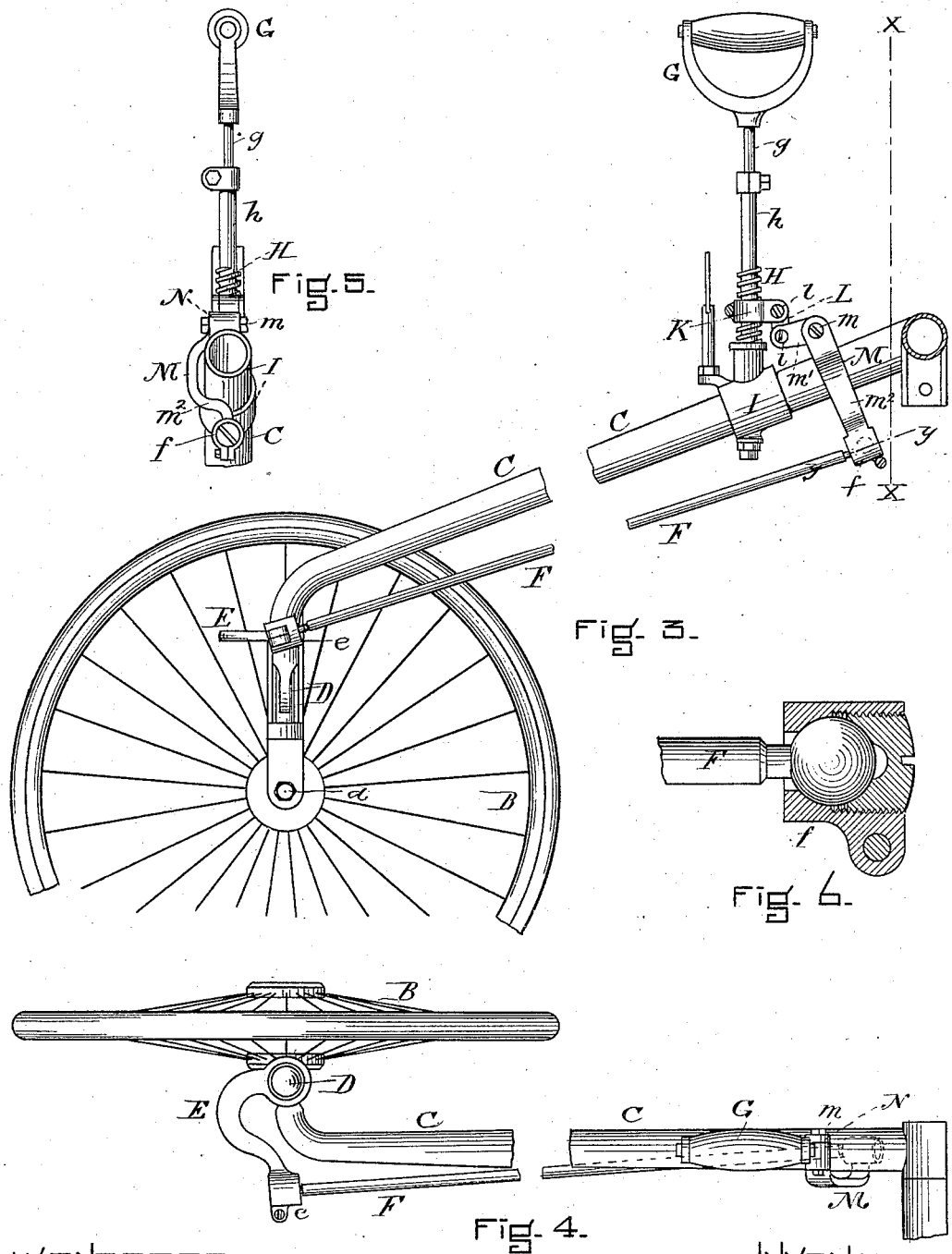
WITNESSES. INVENTOR.

United States Patent Office.

HARRY M. POPE, OF HARTFORD, CONNECTICUT, ASSIGNOR, BY MESNE ASSIGNMENTS, TO THE POPE MANUFACTURING COMPANY, OF PORTLAND, MAINE.

VELOCIPEDE.

SPECIFICATION forming part of Letters Patent No. 365,702, dated June 28, 1887.

Application filed December 12, 1885. Serial No. 185,451. (No model.)

*To all whom it may concern:*

Be it known that I, HARRY M. POPE, of the city of Hartford, State of Connecticut, have invented new and useful Improvements in Velocipedes, of which the following is a specification.

My improvements relate more particularly to the mechanism for steering tricycles and other velocipedes, although they may also be applied in connection with brake mechanism, and have for their object to produce a communicating mechanism between the handle operated by the hand of the rider and the remoter part to be moved—as, for instance, the fork of the steering-wheel—which shall be certain and effective, and which shall, moreover, avoid two tendencies, especially in the means commonly heretofore used—namely, the tendency to rattle and work loose and the tendency to constant disarrangement, jar, and strain to the hand of the rider from the inequalities and obstructions in the road. The most common device heretofore used for connecting the steering-handle and the steering-head in a tricycle has been a rack on the connecting-rod and a pinion on a vertical handle-rod meshing in the rack, with suitable connecting and supporting devices, and sometimes with springs for keeping the rack and pinion in contact. Sometimes, in place of the rack and pinion, a pulley and band has been used; and since the completion of my invention I have become aware of English Letters Patent No 1,124 of 1883, to Burdess, for a steering mechanism of the same type as mine. My improvements are, however, different in certain features from those of Burdess. He shows a vertical handle-supporting rod, as I do; but he supports it in a bracket attached to a standard arising from the frame and at a point on the handle-rod above the threaded portion or worm, and his handle-rod is not adjustable, whereas in my contrivance the vertical handle-rod is adjustable, and is supported in a bracket attached more directly to the frame of the velocipede and so as to secure greater strength and stability in the mechanism. He uses a loose nut or socket upon the worm with trunnions, and a bell-crank lever with a double-slotted arm, and attaches the other arm of the bell-crank lever by a plain joint to a connecting-rod, whereas I construct my traveling socket, or loose nut playing upon the worm, on the lower part of the handle-rod with a lug, and interpose between the lug and the bell-crank-lever arm a connecting-link, and I connect the longer arm of the bell-crank lever by a peculiar ball-and-socket joint or universal joint to the connecting-rod. I also place a universal joint in the connecting-rod at the end which connects with the lever-arm of the steering-head; and thus by a different arrangement of the parts and by the addition of new features I make a more effective and practical steering mechanism than Burdess, and one that can be applied in connection with other parts of a velocipede, and so that the connecting-rod need not necessarily be at right angles to the direction of the handle-supporting rod and to the direction of the steering-head.

I do not claim anything as my invention which is shown or described in the Burdess English patent referred to, and my contrivance may be taken as an improvement upon his, the nature of which will be more fully understood from the following description, taken in connection with the drawings, though I do not desire to be limited precisely to the form and arrangement of the devices shown, since my improvements could be applied in other forms of velocipedes and with slight modifications, which would be obvious to any one skilled in the art of velocipede construction, yet so as to preserve the substance of my invention.

Figure 2:
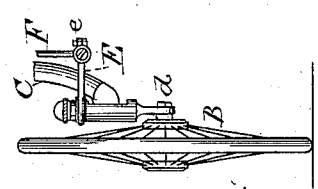

In the drawings, Figure 1 represents in elevation the right-hand side of a tricycle, including the steering-wheel and one of the driving-wheels and the parts of the frame connecting them and the steering mechanism, constructed to embody my improvements in this form. Fig. 2 shows in end elevation the steering-wheel and parts connected therewith. Fig. 3 shows enlarged and in side elevation the steering-wheel and broken parts of the frame and steering mechanism as shown in Fig. 1. Fig. 4 shows in top plan view the same things as Fig. 3, and Fig. 5 shows, in part section on a plane at right angles to that of Fig. 3 at the line *x x* and in end elevation, the parts in the right-hand portion of Fig. 3; and Fig. 6 shows in detail a ball-and-socket joint for the end of the connecting-rod.

A is a driving-wheel.

B is a steering-wheel.

C is a part of the tubular frame connected at one end with the driving-wheel and the rest of the tricycle, and at the other end with the steering-head D, which holds at $d$ the axle of the steering-wheel, in this case C being pivoted in D by vertical steering-centers so formed and so arranged that the wheel can be deflected either way through a small arc for the purpose of steering.

E is a lever or arm, and F is a connecting-rod connected with a ball-and-socket joint, $e$, to the lever-arm E at one end and by a ball-and-socket joint, $f$, to the arm $m^2$ at the other end. These ball-socket joints are constructed as shown in detail in Fig. 6, either end of the rod F being constructed with a ball held in a socket.

The socket $f$ (shown in section in Fig. 6) is substantially cylindrical in form, and has a cavity in the interior forming part of a seat for the spherical ball $f'$, connected to the end of the rod F, and this cavity is continued through one end of the socket to allow for movement of the rod F, while at the opposite end it is enlarged and continued and internally threaded to receive the screw plug or cap $f^2$, which has formed in its inner end a complementary seat for the spherical ball $f'$, and which, by reason of the screw-thread, is capable of adjustment to form a correct bearing for the ball and to take up for wear. I construct the socket $f$ also with a split lug, $f^3$, on one side, and a screw or bolt, $f^4$, passing through the two parts of it, by which the lug may be constructed, and thereby the plug $f^2$ tightened and held securely against jarring loose in the operation of the machine.

G is a steering-handle upon the end of the handle-rod $g\,h$, which parts $g\,h$ are extensible for adjustment, as I prefer to make them. The part $g$ slides in the part $h$, and is held in position by a split lug and a screw, or by a set-screw. The steering-handle rod is supported in a lug, I, attached to the frame of the velocipede, in which it has a free bearing, so as to revolve therein, and above the lug I upon the handle-rod, or that part of it, $h$, which takes its bearing in the lug I, is a worm or coarse screw, H, fixed thereto.

K is a socket threaded to correspond with the worm H.

L is a link pivoted at either end, $l\,l$, to the socket K and the short arm $m'$ of the bell-crank lever M. The bell-crank lever M is pivoted at $m$ to a lug attached to the frame C, and has the arm $m'$ connected through the link L with the socket K, and the other arm, $m^2$, which is here bent upward and outward, and then curved or continued, as $m^3$, so as to be underneath the frame and out of the way, and is connected by a ball-and-socket joint, $f$, with the connecting-rod F.

When the parts are constructed and combined as substantially shown and described, the operation of this steering contrivance is as follows: If the hand be placed upon the handle G and the handle be turned so as to revolve the handle-rod to the right, the worm H, revolving, but not moving vertically, will raise the socket K and the shorter arm of the bell-crank lever M, throwing forward the longer end of this bell-crank lever and the end of the lever-arm E, and so deflect the steering-wheel B and guide the velocipede to the right. If the handle G be turned in the opposite direction, the reverse action will be continued through the parts and the wheel be deflected to the left.

It is obvious that modifications may be made in the form and arrangement of the devices here described and in the locations of the principal parts of the mechanism without departing from the spirit and substance of my invention; and I do not limit myself to the precise forms or arrangements shown or described.

I claim as new and of my invention—

1. In combination with a frame and steering-handle rod and a wheel-connecting rod of a velocipede, a worm and socket, a bell-crank lever, and a connecting-link, essentially as set forth.

2. The combination of a handle, a worm having connections at one end with the handle and at the other end with the supporting-socket on the frame, and being free to rotate, but held from other motion, a traveling socket on the worm between the handle and the supporting-socket, a bell-crank lever fulcrumed on the frame, and having its shorter arm connected by a link with the traveling socket and its longer arm connected by a universal joint with a connecting-rod, all constructed to transmute a rotary motion of the worm into a reciprocating motion of the connecting-rod, essentially as set forth.

3. The combination of a cylindrical socket, complementary screw-cap, and a locking device with a ball and connecting-rod.

4. In a velocipede, the combination, with an operating-piece, as E, and a revolving rod, as $h$, and the frame of a velocipede, of two universal joints, as $e$ and $f$, a connecting-rod, as F, a bell-crank lever, as M, connecting-link, as L, traveling socket, as K, and worm, as H, all constructed and combined to operate essentially as set forth.

HARRY M. POPE.

Witnesses:
WM. B. NELSON,
F. E. BELDEN.